United States Patent [19]

Tackett, Jr.

[11] 4,149,756
[45] Apr. 17, 1979

[54] METHOD FOR MAXIMIZING THE EFFICIENCY OF A HYDROCARBON SLURRY BY CONTROLLING THE OVERHEAD CUT

[75] Inventor: James E. Tackett, Jr., Littleton, Colo.

[73] Assignee: Marathon Oil Company, Findlay, Ohio

[21] Appl. No.: 799,826

[22] Filed: May 23, 1977

[51] Int. Cl.$^2$ .................. B65G 53/00; C10G 7/00; F17D 1/17
[52] U.S. Cl. ........................... 302/66; 137/13; 208/347; 208/370; 208/DIG. 1
[58] Field of Search ............ 137/12, 13; 208/DIG. 1, 208/347, 370; 302/66

[56] References Cited

U.S. PATENT DOCUMENTS

| | | | |
|---|---|---|---|
| 2,977,289 | 3/1961 | Kron | 208/DIG. 1 |
| 3,184,396 | 5/1965 | Armstrong | 208/DIG. 1 |
| 3,804,752 | 4/1974 | Merrill et al. | 208/93 |
| 3,976,179 | 8/1976 | Harrison et al. | 208/DIG. 1 |

OTHER PUBLICATIONS

Sachanen, "The Chemical Constituents of Petroleum" (1945), Reinhold Publishing Corp., New York, N.Y. pp. 294–295.

Primary Examiner—Herbert Levine
Attorney, Agent, or Firm—Joseph C. Herring; Jack L. Hummel

[57] ABSTRACT

The efficiency of a hydrocarbon slurry is maximized by determining the largest percent of economically pumpable distillation overhead that can be obtained from the hydrocarbon. This determination is based on the properties of the overhead as a carrier fluid in the transporting system (e.g. slurry viscosity or pumpability). Once determined, the composition of the optimum overhead is determined by the usual techniques, i.e., by gas chromatographic techniques, to determine its composition and the cut point defined in terms of the composition of the optimum overhead. The composition of the overhead is monitored during the refining process and is compared with the composition of the optimum overhead. The distillation process is then monitored and controlled accordingly to produce an overhead with the desired molecular composition. One advantage of this method is that it limits the amount of undesirable wax crystals in the overhead. The method works particularly well with waxy hydrocarbon mixtures in fractional distillation processes.

7 Claims, No Drawings

METHOD FOR MAXIMIZING THE EFFICIENCY OF A HYDROCARBON SLURRY BY CONTROLLING THE OVERHEAD CUT

BACKGROUND OF THE INVENTION

This invention relates to the preparation, storage and transportation of hydrocarbon mixtures. In this field, the mixture is distilled to produce an overhead fraction which is used as the carrier fluid for the heavier fractions. The heavier fractions are carried in the overhead in the form of particles of diameters about 0.05 mm to about 20 mm. These particles are formed by such processes as prilling, extruding or beading and the resulting slurry is pumped in a transporting system that includes a pipeline. Upon pumping, these particles partially dissolve with time and mixing to leave isolated wax crystals.

In order to maximize the percent of each hydrocarbon mixture that can be processed into a transportable slurry, as much overhead as possible must be distilled. The problem in the art has been to determine the maximum amount of overhead that can be obtained from the hydrocarbon without creating a slurry which has too large a pressure drop when pumped. Past methods used the cloud point or pour point to determine the distillation cut point for the overhead. In the pour point methods, the cut point is generally at a fraction whose pour point is about 5° F. to about 10° F. below the average temperature of the transporting system.

Experimental data has shown that the use of the cloud point or pour point to determine the distillation cut point is unreliable. In some cases, a low viscosity overhead with a pour point higher than the slurry pumping temperature contributed little to the slurry pressure drop whereas a lower pour point overhead (10° F. below the slurry pumping temperature) contributed significantly to the pressure drop within the pipeline. In particular, methods that use the cloud point or pour point to determine the maximum amount of overhead that can be taken do not consider the resulting amount of wax crystals in the overhead due to the distillation process used. These wax crystals are much smaller than the congealed particles of the heavy fractions in the slurry and their presence in the overhead greatly increases the pressure drop. After the congealed particles disintegrate leaving isolated wax crystals, some wax crystals from the overhead are still detrimental to the slurry pumpability.

Processes such as flash distillation can have a large overlap in the cuts and can result in overheads with a great number of wax crystals. The wax crystals are from fractions that boil within the range of the heavy cuts and crystallize in the overhead at temperatures above the slurry transporting temperature. Additives do not affect the amount of wax crystals in the overhead but can modify the crystal structure of the wax which crystallizes in the presence of these additives and be beneficial in some, but not all cases. Regardless of the cause, these wax crystals are more economically conveyed in the congealed particles of the heavy fractions than in the overhead and should be minimized in the overhead.

This invention provides a method to determine the optimum overhead properties and to monitor and control the distillation of a hydrocarbon mixture in order to produce as much economically pumpable overhead as possible. It also increases the efficiency of transportation of hydrocarbon slurry systems by the use of continuous analysis of the feed.

PREFERRED EMBODIMENTS OF THE INVENTION

In this invention, the optimum cut point for the overhead of each hydrocarbon mixture in a particular distillation process is determined empirically by evaluating pipeline and/or viscosity data. Using pipeline data, the optimum or maximum amount of overhead that can be economically pumped is determined by correlating the pressure drops in the pumped slurry with the cut point. This is done for each hydrocarbon mixture to be fractionated. The increasing cut temperatures are correlated with the increase in the rate of change in the overhead viscosity or with the rate of increase in pressure drop when the overhead is combined with hydrocarbon particles to form a slurry and the slurry is transported in a pipeline. Using viscosity data, the optimum overhead is determined by correlating the viscosity of various distillation fractions with cut point temperatures. This procedure is preferred because the viscosity can be measured using a relatively small amount of sample and it is not necessary to produce a slurry and test it to obtain the data.

Once the optimum overhead is empirically determined, it is analyzed by automatic instrumentation, e.g. gas chromatography or mass spectroscopy techniques to determine its composition. The cut point is then expressed in terms of instrument data and the distillation process monitored and controlled accordingly to produce an overhead with the desired carbon number distribution. Specifically, heavy materials with carbon numbers above the desired number or in quantities above the desired amount are minimized in the overhead. These heavy materials can then be removed from the slurry system or transported as wax crystals in the congealed particles in the slurry.

Initially, the pressure drop of a pumped waxy hydrocarbon slurry of congealed heavy fraction particles in a distillation overhead is only slightly higher than the pressure drop of the overhead. However, with time and mixing, the congealed particles disintegrate leaving the wax crystals from the heavy fraction. After stabilization, the pressure drop can be expressed by $\Delta p = ae^{bx}$. The pressure drop ($\Delta p$) is in terms of psi, "a" and "b" are constants relating to the size of the pipeline and the flow rate of the slurry, and "x" is the percent of wax crystals in the slurry from the congealed particles. The particles are formed by such processes as prilling, beading, and extruding and have diameters of about 0.5 mm to about 20 mm.

Examples of appropriate waxy hydrocarbon mixtures include crude oils which exhibit a "waxy gel" appearance at seasonably ambient temperatures. These oils contain about 5% to about 80% wax (wax being defined as the precipitate which forms after one part of crude oil is dissolved in 10 parts of methyl ethyl ketone at about 80° C. and the mixture chilled to $-20°$ C.) and preferably have an average pour point above the average minimum temperature of the transporting system. If water is present in the slurry, the "bx" term must be expanded to $b(x+0.48y)$ where "y" is the percent of water in the system.

It has been found that if the distillation overhead is not cut properly, the true pressure drop exceeds that calculated by the above expressions. This increased pressure drop is due to wax crystals in the overhead.

These wax crystals in the overhead have a threshold limit based on their size, type and content. When this threshold is exceeded, the pressure drop along the pipeline during transportation increases greatly. The excess pressure drop caused by a distillation cut with too much heavy materials in the overhead can be expressed as equivalent "effective" crystals in the congealed particles by $\Delta p = ae^{b(X+Xe)}$. "Xe" is the concentration of crystals in the congealed particles that have the same effect on pressure drop. It is known that crystals in the overhead are more difficult to pump than the same crystals in the congealed particles.

The maximum amount of overhead that can be economically pumped is best determined empirically because so many factors affect the pumpability of the slurry. This can be done by monitoring viscosity of the overhead or slurry pressure drop as a function of percent of overhead or degree of rectification used in obtaining the overhead cut. For example, when a plot of viscosity or slurry pressure drop versus percent overhead shows a large positive increase in slope, then the distillation cut point is the highest percent of overhead which can be obtained before reaching the change of slope. Once determined, the optimum overhead can be analyzed by gas chromatographic or other techniques to discover its composition. The cut point for the particular distillation process and hydrocarbon mixture used can then be defined in terms of carbon number distribution and the distillation process monitored and controlled accordingly to produce an overhead with the desired carbon number distribution. This method will produce the maximum amount of economically pumpable overhead for a given hydrocarbon mixture and a given distillation process.

The method of this invention works particularly well with waxy hydrocarbon mixtures but is equally applicable to other wax containing materials including some crude oils, shale oils, tar sand oils, fuel oils, gas oils, and mixtures thereof. The method of this invention is also applicable to all distillation processes and works particularly well with distillation processes which produce relatively sharp cuts.

What is claimed is:

1. In a method of transporting a slurry through a pipeline wherein a hydrocarbon mixture is distilled in a distillation process and the overhead from said process is used as a carrier liquid portion of said slurry, the improvement for maximizing the amount of economically pumpable overhead comprising:
   (a) determining the substantially optimum distillation overhead cut point for said hydrocarbon mixture undergoing distillation by taking, as the optimum cut point, the cut point distillation overhead temperature at which there is a substantial increase in the correlated rate of increase in
      (1) viscosities of samples of distillation overhead taken during the distillation process and/or
      (2) pressure drop during the pipelining of slurries comprising said overhead samples, and solids with distillation overhead temperature and
   (b) analyzing the sample taken at substantially the substantially optimum overhead cut point, to determine the molecular carbon number distribution,
   (c) at least periodically comparing the molecular carbon number distribution of the sample taken substantially at the substantially optimum overhead cut point with the molecular carbon number distribution of the overhead in the distillation process and
   (d) adjusting the distillation process to separate an overhead fraction having substantially the molecular carbon number distribution of the sample taken substantially at the substantially optimum overhead cut point.

2. The method of claim 1 wherein the distillation process is controlled by gas chromatographic techniques.

3. The method of claim 1 wherein the distillation process is controlled by mass spectrometric techniques.

4. The method of claim 1 wherein the composition of the preferred overhead is analyzed by gas chromatographic techniques and the composition of the overhead of the distillation process is monitored by gas chromatographic techniques.

5. The method of claim 1 wherein the composition of the preferred overhead is analyzed by mass spectrometric techniques and the composition of the overhead of the distillation process is monitored by mass spectrometric techniques.

6. The method of claim 1 wherein the distillation process has a relatively sharp cut point.

7. The method of claim 1 wherein the slurry includes congealed particles of diameters from about 0.05 mm to about 20 mm and the transporting system includes a pipeline.

* * * * *

UNITED STATES PATENT AND TRADEMARK OFFICE
CERTIFICATE OF CORRECTION

PATENT NO. : 4,149,756

DATED : April 17, 1979

INVENTOR(S) : James E. Tackett, Jr.

It is certified that error appears in the above-identified patent and that said Letters Patent are hereby corrected as shown below:

Column 2, line 51, "0.5 mm" should read -- 0.05 mm --.

Signed and Sealed this

Tenth Day of July 1979

[SEAL]

Attest:

Attesting Officer

LUTRELLE F. PARKER

Acting Commissioner of Patents and Trademarks